United States Patent [19]
Hystad

[11] Patent Number: 5,351,430
[45] Date of Patent: Oct. 4, 1994

[54] DEVICE AND A METHOD FOR AUTOTRAWL OPERATION

[75] Inventor: Per H. Hystad, Kopervik, Norway

[73] Assignee: Karmoy Winch A/S, Kopervik, Norway

[21] Appl. No.: 56,903

[22] Filed: May 5, 1993

[30] Foreign Application Priority Data

May 6, 1992 [NO] Norway .................................. 921796

[51] Int. Cl.⁵ .................................................. A01K 73/02
[52] U.S. Cl. .................................................. 43/9.1; 254/273
[58] Field of Search ............... 254/273, 277, 900, 325, 254/326, 327; 43/8, 9.1

[56] References Cited
U.S. PATENT DOCUMENTS

| | | | |
|---|---|---|---|
| 3,343,810 | 9/1967 | Parnell | 254/273 |
| 4,098,082 | 7/1978 | Packer | 254/900 |
| 4,155,538 | 5/1979 | Claassen | 254/277 |
| 4,236,695 | 12/1980 | Morrison | 254/277 |
| 4,323,222 | 4/1982 | Dempster et al. | 43/9.1 |
| 4,349,179 | 9/1982 | Barber | 254/900 |
| 4,624,450 | 11/1986 | Christison | 254/273 |

FOREIGN PATENT DOCUMENTS

| | | | |
|---|---|---|---|
| 1117692 | 6/1968 | United Kingdom | B66D 1/50 |
| 1340247 | 12/1973 | United Kingdom | B66D 1/50 |

*Primary Examiner*—P. Austin Bradley
*Assistant Examiner*—Chuck Y. Mah
*Attorney, Agent, or Firm*—Cushman, Darby & Cushman

[57] ABSTRACT

A compensating device equipped with a hydraulic cylinder/piston arrangement as a damping member, and a sheave operatively connected with the cylinder and piston arrangement, and a hydraulic accumulator connected to the cylinder, for use on board a trawler vessel operating in autotrawl mode for dampening shock forces or alternating stresses on trawl pulling wire elements between the trawler vessel winch system and a bottom trawl.

4 Claims, 2 Drawing Sheets

DEVICE AND A METHOD FOR AUTOTRAWL OPERATION

BACKGROUND OF THE INVENTION

The present invention relates to supplementary equipment for trawl winches and, more specifically a device for use on board a trawl vessel operating in autotrawl mode for dampening shock forces or alternating stresses on a pulling wire between the trawl vessel winch system and a bottom trawl or floating trawl, and a method making use of a compensating device equipped with hydraulic cylinder/piston means as damping members, sheave means operative with the cylinder and piston means, and hydraulic accumulator means connected to the cylinder means.

When a trawl vessel is trawling with a bottom trawl, the trawl board is dragged along the bottom. The force between the trawl board and the bottom may be 1–9 tons, depending on the size of the trawl gear and trawler. Due to the construction design of the trawl board, it is important for the steering of the trawl board and trawl that the board move at an even speed along the bottom during trawling, and that the force against the bottom be kept uniform.

Although, in the following, the invention is described specifically with a bottom trawl used as the trawl type, it shall be understood that the invention is equally applicable to trawling with a floating trawl.

In present day trawling on modern trawlers, an auto-trawl system is used wherein the winch works against a "mooring" valve, during the actual trawling, in the attempt to maintain as uniform a force as possible in the trawl wire. This works well theoretically, but in practice many problems arise which interfere with the ability to maintain a uniform wire force. In practise, a pre-programmed wire length for the trawling controls the winch operation, such that wire length which has left the wire drum is kept within certain limits, thus yielding an almost constant force on the two wires used for the trawling operation.

Conditions that render it difficult to keep the wire force uniform are the following:

a) Substantial dynamic inertia in the trawl winch. This means that the stress variations created in the wires when the trawler vessel rides the waves cannot be properly averaged with the prior art trawl systems.

b) The control system for the power regulating valve and the hydraulic system connected thereto is unable to control the wire force with sufficient precision.

c) The trawler vessel in bad weather, when riding on large waves, may undergo very rapid variations in speed, resulting in failure of the winch system to attain a high enough capacity and speed to maintain equal force in the two trawl wires at all times.

Besides the disadvantages associated with failure to maintain a uniform wire force when trawling in inclement weather, there are other drawbacks, such as:

d) The trawl winches operate continuously under heavy stress by heaving in and paying out wire during trawling operations. The winches are controlled by the autotrawl system. This yields long operational periods for the winches, and the operation is also strongly changing from low to maximum speed and load. Such winch operation will cause heavy wear and tear, and experience has shown many cases of breakdown for trawl-winch systems operating in auto-trawl mode. Further, the prior art system has a continuous operational power demand of approximately 120 kW for operation in inclement weather.

e) Considerable energy is used for trawling in the autotrawl mode when the weather is bad.

f) The trawl wire is subjected to heavy wear and tear when trawling takes place in an autotrawl situation, as has hitherto been the case. Since the winches have substantial dynamic inertia, load or power peaks are reached which wear out the wire when it is payed out and heaved in during trawling in bad weather. In addition, there frequently arise situations in which the wire is arranged poorly on the drum, where the wire becomes crossed-over, and severe deformation and wear occur in auto-trawling.

g) In the prior art auto-trawl systems, the trawl speed varies between 6 and 2 knots when trawling under inclement weather conditions. The most efficient speed of the trawl when trawling for cod-fish is 5 knots.

Thus, the efficiency of fishing would greatly improve if the trawl can be provided with an steady motion at the sea bottom. The more the smoothing of the trawl speed, the greater the fishing efficiency. If the trawl is moved stepwise or in intervals, it will not follow the bottom satisfactorily, and fish will escape above or below the trawl.

SUMMARY OF THE INVENTION

The present invention thus aims at combining a passive damping device with each of the two trawl winches located on board the trawler vessel, thereby enabling the winches to maintain equal force in the wires during trawling under bad weather conditions.

Consequently, according to the present invention, the device described above is characterized in that the trawl vessel is provided with compensating means having hydraulic piston and cylinder means as damping members, sheave means operative with said cylinder and piston means, respectively, and a hydraulic accumulator connected to the cylinder means, and an autotrawl computer being connected via signal line means to means for measuring position, acceleration and direction of movement of the piston means relative to the cylinder means, and the computer being capable of controlling winch system operation on the basis of such measurement. Further, said autotrawl computer is adapted to cause said piston means to assume a position midway along said cylinder means. The method comprises using the compensating device on board a trawler vessel operating in autotrawl mode for dampening shock forces or continuous alternating stresses on trawl pulling wire means extending between the trawler vessel winch system and a bottom trawl means, and using an autotrawl computer of the vessel for recording position acceleration and direction of movement of the piston means relative to the cylinder means, to cause the piston means to assume an intermediate position, e.g., midway, along the cylinder, thereby maintaining a steady wire force on the bottom trawl. Further, the winch system winches are held non-rotative when the compensating device provides a steady wire force on the bottom trawl.

BRIEF DESCRIPTION

The invention will now be described in more detail with reference to the enclosed drawing figures, in which:

FIG. 1 is a schematic side elevation view of a auto-trawling system, which shows the principles of the present invention, and FIG. 2 is a more detailed fragmentary top plan view of the system according to the invention.

DETAILED DESCRIPTION

Figure 1:
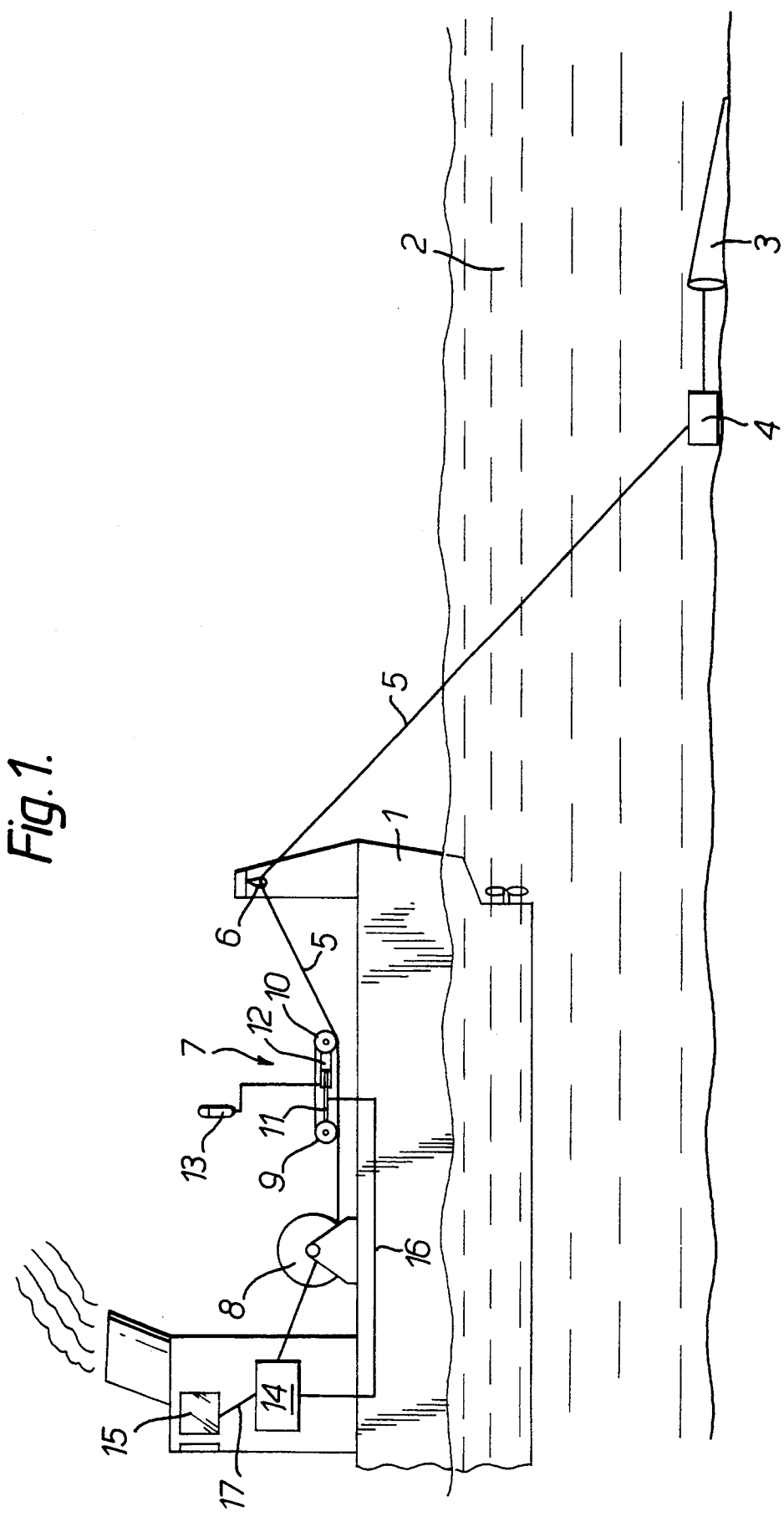

In FIG. 1 there is shown a trawler vessel operating in autotrawl mode on the sea 2. A bottom trawl 2 is pulled by the trawler vessel 1 via a trawl board 4 and wire means 5, the wire means running over trawl block means 6 via a compensating device 7 to trawl winch means 8. The compensating device 7 consists preferably of sheave means 9 and 10, operative with piston rod means 11 and cylinder means 12 of the compensating device. A hydraulic accumulator 13 is connected to the cylinder means 12.

Figure 2:
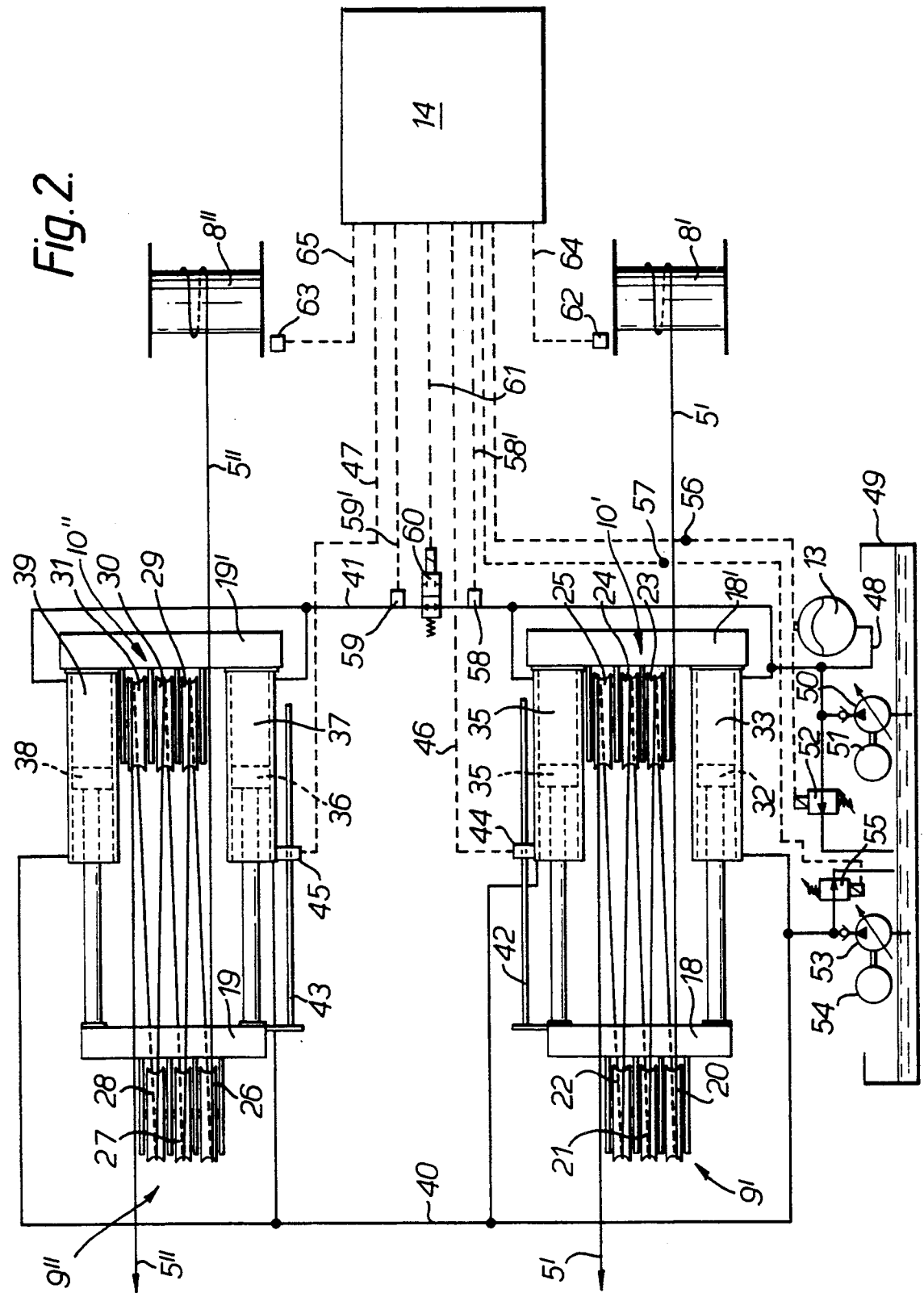

For the sake of simplicity, the system is in FIG. 1 shown with a single pair of sheaves 9 and 10, and a piston rod 11 and cylinder 12, as well as single wire 5. However, in a practical embodiment, as shown in FIG. 2, there will be a plurality of pairs of sheaves as well as piston/cylinder sets, as will be described further below.

With reference to FIG. 1, modern trawlers today are all equipped with a computerized trawl unit 14 which monitors and controls the trawl winches 8 so that the trawl 3,4 functions in the most effective manner. The position of the piston or piston rod 11 for the passive damping cylinder 12 for each of the trawl wires 5 will provide a measure of the force acting on each of the trawl wires. During active autotrawling when the trawl winches are working on mooring valves (not shown), it would be advantageous to monitor or control the mooring valves in such manner that both piston means remain in an intermediate position, relative to the cylinder means.

The signals transmitted to the autotrawl computer 14 via signal path 16 are a function of position, acceleration and direction of movement of the pistons in the respective cylinders 12.

For example, mooring valves for two trawl winches may be controlled in such manner that a mooring valve for winch 8, where damping cylinder 12 is least compressed, heaves-in so that the piston of damping cylinder 12 assumes an intermediate position therein. The cylinder 12 having most compression will then cause the piston therein to automatically move toward an intermediate position, and equal forces action of both trawl wires 5 are thus obtained.

The damping system 7 will thereby facilitate the control of the active control system 8, 14, which is controlled by regulation of mooring valves. Furthermore, it is possible in this manner to derive a signal for measurements of force and length from the damping system more easily than from the trawl winches themselves. Communication between the computer 14 and the pilot house 15 takes place via a connection 17.

By combining this type of compensating device or damper with each of the two trawl winches 8 and trawl computer 14 located on board the trawler vessel 1, it is possible to maintain equal forces acting on the trawl wires during trawling in bad weather.

It is also conceivable that the computerized trawl would be capable of influencing the gas pressure in the accumulator 13, thereby holding the damping members in intermediate position, e.g., via a regulator (not shown) connected between the accumulator (13) and the cylinder or between the two sides of the piston in the cylinder.

The system is now to be described in further detail with reference to FIG. 2.

There are two sets of cylinder frames 18, 19 and 18', 19', and two sets of pair of sheaves 9', 10'and 9", 10" connected to the cylinder frames 18, 19 and 18', respectively. The set of sheaves 9' is constituted by three sheaves 20, 21 and 22; the set of sheaves 10' by three sheaves 29, 24 and 25 ; the set of sheaves 9" by three sheaves 26, 27 and 28; and the set of sheaves 10" by three sheaves 29, 30 and 31. Wires 5' and 5" are running over the sets of pairs of sheaves 9', 10' and 9", 10", respectively.

Two trawl winches 8' and 8" are provided for each set of pair of sheaves with respective wire. Further, in order to alter the mutual distance between sheaves 9', 10' and 9", 10", respectively, there are provided two pairs of piston and cylinder combinations, labelled as 82, 99 ; 34, 35 and 36, 37; 38, 39, respectively. The cylinders 93, 35, 37, 99 are hydraulically powered through supply lines 40, 41. The layout of sheaves, wires, frames , piston/cylinder combinations are each conventional in the art.

Means for determining the mutual distance between sheaves 9', 10' and 9", 10", respectively, are provided through position rods 42, 43 and associated rod position sensors 44, 45, these sensors being connected to the computer 14 through respective lines 46, 47. Reference numeral 12 denotes an hydraulic accumulator connected to the piston top side of the cylinders 33, 35, 37, 39 through line 48. An oil sump 49 is provided for delivering oil to a pump 50, driven by a motor 51, the pump 51 being for adjusting accumulator pressure in accumulator 13. An accumulator pressure control valve 52 is provided at the exits from the pump 51 and accumulator 13. A further pump 53 powered by a motor 54 delivers pressurized oil to supply line 40 which leads to the piston rod side of cylinders 33, 35, 37 and 39. Pump 53 collects oil from sump 49, and a pressure control valve 55 is provided at the exit side of the pump 53 for controlling the hydraulic pressure on the piston rod side of the cylinders 33, 35, 37, 39, and thereby controlling the response time of the system. Valves 52 and 55 are controlled by computer 14 through lines 56 and 57, respectively.

Pressure transducers 58 and 59 are located on supply line 41 on either side of an open/close valve 60, the valve 60 controllable by computer 14 through line 61. The transducers communicate with the computer through lines 58' and 59'.

In order to record rotation of wire drums 8' and 8", there are provided drum rotation pickup means 62, 69 signalling rotation of the respective drums through lines 54 and 65, respectively.

In the operation of the system according to FIG. 2, the winches 8', 8" will be controlled through lines 64 and 65 from computer 14, the hydraulic system attempting to maintain the wire length within a specific, preset limit and with equal power. The position sensors 44 and 45 control, via computer 14, the valve 52, the valve adjusting the hydraulic pressure of accumulator 13, in order to position the pistons 32, 34, 36, 38 at any time midway along the respective cylinders 33, 35, 37, 39 under changing trawling conditions.

As seen from FIG. 2, the two frames 18, 18' and 19, 19' are hydraulically interconnected and operate in tandem. The pairs of sheaves 9', 10' and 9", 10" may include e.g. a total of six sheaves (as shown) or more, respectively. In trawling operation under rough weather conditions, the forces acting on the wires will be balanced through the two frames 18, 18' and 19, 19', without the need for operation of the winches 8', 8". Thus, a frame system including members 18, 18' being subjected to increase in wire force will be be capable of delivering pressurized oil to another frame system including members 19, 19'—or vice versa. This means that the frame having the greatest acting forces will pay out wire and thereby reduce the wire force, whereas the frame having the lowest acting forces will heave-in wire and increase its wire force, such that the wire force of the two trawl wires balance.

In cases where both wire systems have to heave-in and pay-out wire simultaneously, the accumulator will receive and deliver hydraulic oil to the frame systems. No energy to the winches are required under such conditions, and accordingly, rapid movements of the winches are avoided, thus resulting in reduced rotational operation of the winches and increased lifetime.

The advantages achieved by this are the following:

The winch may stand with the drum band brakes operative during trawling. The winch would then stand still, and it would be the damper 7 that provides for a uniform force in the wire. The damper or compensating device 7 has very little dynamic inertia, since its hydraulic system works against the large accumulator 13.

By utilizing a sufficient number of sheaves in addition to stroke length, it is possible by this means to select the effect that the compensating device should yield and the wire movement that the compensating device will provide. In this case, the wire will work over large and precisely adapted sheaves—e.g. of a size equal to 25 times the diameter of the wire—and it will thus suffer little wear compared with what it is subjected to on the drum. This system may easily be equipped with the required capacity for the hydraulic system of damper 7, so that the rapid movements that the trawler vessel undergoes may be counterbalanced without bringing about changes in the wire force that are nearly as great as those currently experienced with autotrawl control of the trawl winches. Coordination with a conventional autotrawl system that is in operation will also afford advantages in that the system is given a longer time to react. This will in turn enable the autotrawl system to function with improved efficiency, and the load/power peaks in the trawl wires will be reduced. This will permit a smoother movement of the trawl boards 4 and less wear and tear on the winch and trawl gear.

In those instances where the trawl 2 catches on or digs itself into the bottom, the use of such a compensating device gives the trawl winches time to release the brakes and start a controlled lowering or feeding out of the wire in order to avoid wear on the trawl wire. The position rod sensors give signals for release of the brakes, feeding out for the trawl winches and, for example, an alarm in the pilot house.

The huge stern trawlers currently being built are equipped with larger and larger trawl winches, and the trawl wire has increased in length and dimension. These are also factors making it increasingly more beneficial to combine a passive damper with each of the two trawl winches.

Thus, the invention provides for a damper system for each trawl wire 5', 5", by interconnecting the wires hydraulically as shown and described above.

The present invention further provides a substantial balancing of the trawl wire forces by enabling hydraulic oil to pass from one system to another or vice versa, and there by creating a heave-in operation in one system and pay-out operation in the other one, or vice versa. Also, there remains the possibility of heave-in and pay-out simultaneously on both trawl wires, with the possibility of unequal speed, in order to maintain the force of both trawl wires equal when trawling under adverse weather conditions.

Loads and effective operation periods of the winches are reduced to a fraction of that known from the prior art. Thus, the invention provides for an increase of winch lifetime and for fewer cases of winch breakdown. The overall power is low relative to that required by the prior art solutions, as the accumulator 13 is capable of delivering and receiving energy.

Also, the trawler vessel will, in using the invention, be able to maintain a higher speed than before during trawling. This will provide better fishing conditions. With the invention, it would be possible to keep the trawling speed in the range of 5.5–4 knots.

In conclusion, the present utilization of a passive compensating device will result in better fishing, less damage and wear on the trawl gear, less wear and tear on the winches and hydraulic pumps, lower energy consumption in trawling, and improved safety against accidents for the crew in connection with any rupture of trawl wires.

Having described my invention, I claim:

1. A trawler equipped for trawling in an autotrawling mode in a body of water having a bed and a surface, comprising:

a trawler afloat on the surface of the body of water;

a submerged trawl disposed for moving along the bed or between the bed and the surface;

first and second trawl wires having one ends connected to the trawl for towing the trawl from the trawler;

first and second power-operated trawl winches mounted on the trawler;

said first and second trawl wires having respective opposite ends thereof connected to respective of said first and second trawl winches, whereby said trawl winches are adapted to heave-in and pay-out said first and second trawl wires, and said first and second trawl wires extend along respective wire paths from said first and second trawl winches to said trawl;

a compensating device for damping shock waves or alternating stresses exerted on said first and second trawl wires, said compensating device including:

first and second cylinder frames supported on said trawler, each having fixed portion and a movable portion which is movable along the respective said wire path relative to the respective fixed portion;

first and second hydraulic rams, each including a pair of tandemly operating piston and cylinder sets, of which the pistons thereof are mounted to one of said frame portions of the respective said cylinder frame, and the cylinders thereof are mounted to the other of said frame portions of the respective said cylinder frame;

a respective set of sheaves mounted to each said cylinder frame portion for rotation about a respective axis transverse to the respective said wire path;

an intermediate portion of said first trawl wire respectively running between and being wrapped around sheaves of respective of said sets of sheaves on said first cylinder frame and an intermediate portion of said second trawl wire running between and being wrapped around sheaves of respective of said sets of sheaves of said second cylinder frame, so that as said rams extend and contract, respective said cylinder frame movable portions are moved away from and towards respective said cylinder frame fixed portions, and thereby effectively heave-in and pay-out respective of said first and second trawl wires;

a computer-controlled hydraulic system for powering said piston and cylinder sets, including:

a supply of hydraulic fluid, a hydraulic line for communicating said supply with each of said cylinders for extending and contracting said rams;

a hydraulic accumulator incorporated in said hydraulic line;

a hydraulic pump incorporated in said hydraulic line and arranged for delivering pressurized hydraulic fluid from said hydraulic line from said supply to said hydraulic accumulator;

a first controllable valve operatively connected to said accumulator for bleeding pressurized hydraulic fluid therefrom back to said supply;

a second controllable valve operatively connected to each said cylinder for bleeding pressurized hydraulic fluid therefrom back to said supply;

first and second position sensors respectively operatively associated with said first and second cylinder frames for sensing amount of extension of respective of said rams, acceleration and direction of movement of respective of said cylinder frame movable portions relative to respective of said cylinder frame fixed portions;

first and second pressure sensors for sensing hydraulic pressure within respective of said cylinders;

first and second rotation sensors for sensing rotation of respective of said trawl winches;

a third controllable valve which is openable and closeable and is incorporated in said hydraulic line between said accumulator and said cylinders and between said first and second pressure sensors; and a programmable computer arranged to operate said first, second and third controllable valves depending on signals received by said computer from said first and second position sensors, and first and second pressure sensors and said first and second rotation sensors.

2. The trawler of claim 1, wherein:
said computer is programmed to operate said first, second and third controllable valves such as to tend to maintain each of said rams extended to approximately a midway extent thereof.

3. The trawler of claim 2, wherein:
said computer is operatively connected with said winches for controlling power operation thereof; and said computer is programmed to cause said first and second winches to be non-rotating when at least one of said rams is extending or contracting, for tending to steady stresses on said first and second trawling wires and thereby to steady pulling force on said trawl.

4. The trawler of claim 1, wherein:
said computer is operatively connected with said winches for controlling power operation thereof; and said computer is programmed to cause said first and second winches to be non-rotating when at least one of said rams is extending or contracting, for tending to steady stresses on said first and second trawling wires and thereby to steady pulling force on said trawl.

* * * * *